(12) United States Patent
Ewert

(10) Patent No.: US 7,493,977 B1
(45) Date of Patent: Feb. 24, 2009

(54) MOTORIZED CHARIOT

(76) Inventor: Terry Ewert, 814 E. First Ave., Dorchester, WI (US) 54425

( * ) Notice: Subject to any disclaimer, the term of this patent is extended or adjusted under 35 U.S.C. 154(b) by 361 days.

(21) Appl. No.: 11/353,433

(22) Filed: Feb. 14, 2006

Related U.S. Application Data

(60) Provisional application No. 60/653,005, filed on Feb. 15, 2005.

(51) Int. Cl.
*B62D 59/00* (2006.01)

(52) U.S. Cl. .................................. 180/14.1; 280/444

(58) Field of Classification Search .............. 180/14.1, 180/14.2; 280/444
See application file for complete search history.

(56) References Cited

U.S. PATENT DOCUMENTS

| | | | | |
|---|---|---|---|---|
| 2,384,092 A * | 9/1945 | Hollos | ........................ | 180/14.1 |
| 2,727,581 A * | 12/1955 | Wright | ........................ | 280/419 |
| 3,061,029 A * | 10/1962 | Pryor | ........................... | 180/12 |
| 3,513,924 A * | 5/1970 | Jackson | ........................ | 180/14.1 |
| 3,524,514 A * | 8/1970 | Kratzke | ........................ | 180/420 |
| 3,586,119 A * | 6/1971 | Chuchua et al. | ............. | 180/14.1 |
| 3,738,440 A | 6/1973 | Storm | ........................... | 180/13 |
| 3,840,085 A * | 10/1974 | Smith | ........................ | 180/14.1 |
| 3,973,639 A * | 8/1976 | Stewart | ........................ | 180/14.2 |
| 4,221,276 A * | 9/1980 | Mitchell et al. | .............. | 180/209 |
| 4,325,565 A | 4/1982 | Winchell | ........................ | 280/282 |
| 4,503,925 A | 3/1985 | Palmer et al. | ................... | 180/13 |
| 6,336,600 B1 | 1/2002 | Jessen | .......................... | 239/663 |
| 6,889,784 B2 | 5/2005 | Troll | ............................ | 180/13 |
| 2004/0144586 A1 | 7/2004 | Trott | ............................ | 180/213 |

* cited by examiner

*Primary Examiner*—Kevin Hurley
(74) *Attorney, Agent, or Firm*—Westman, Champlin & Kelly, P.A.; Z. Peter Sawicki

(57) ABSTRACT

A motorized chariot comprises a drive unit, a driver carrier unit and a tongue pivotally connecting the drive unit with the driver carrier unit. A tie-rod extends between the drive unit and the carrier unit with the tie-rod being moveable between the carrier unit and the frame such that movement of the tie-rod causes pivoting between the drive unit and the driver carrier unit to enable steering of the motorized chariot.

12 Claims, 5 Drawing Sheets

MOTORIZED CHARIOT

CROSS-REFERENCE TO RELATED APPLICATION

The present application is based on and claims the benefit of U.S. provisional patent application Ser. No. 60/653,005, filed Feb. 15, 2005, the content of which is hereby incorporated by reference in its entirety.

BACKGROUND OF THE INVENTION

The present invention relates to a vehicle having a motorized drive unit and a driver carrier unit pulled by the drive unit.

Conventional chariots are two-wheeled platforms towed by a horse or horses. It is believed that chariots originated in Mesopotamia whose use spread eventually to Egypt. The use of the war chariot has been popularized in movie films such as Ben-Hur in which one of the memorable scenes is a chariot race.

Maintaining chariots was expensive in Egyptian times and is expensive today. Attempts have been made to duplicate the experience of riding on a chariot without the use of horses. One such attempt is described in the Troll U.S. Pat. No. 6,889,784.

SUMMARY OF THE INVENTION

A motorized chariot comprises a drive unit, a driver carrier unit and a tongue pivotally connecting the drive unit and the driver carrier unit. A tie-rod extends between the drive unit and the carrier unit with the tie-rod being moveable between the carrier unit and the drive unit such that movement of the tie-rod causes pivoting between the drive unit and the driver carrier unit to enable steering of the motorized chariot.

DETAILED DESCRIPTION OF ILLUSTRATIVE EMBODIMENTS

Figure 1:
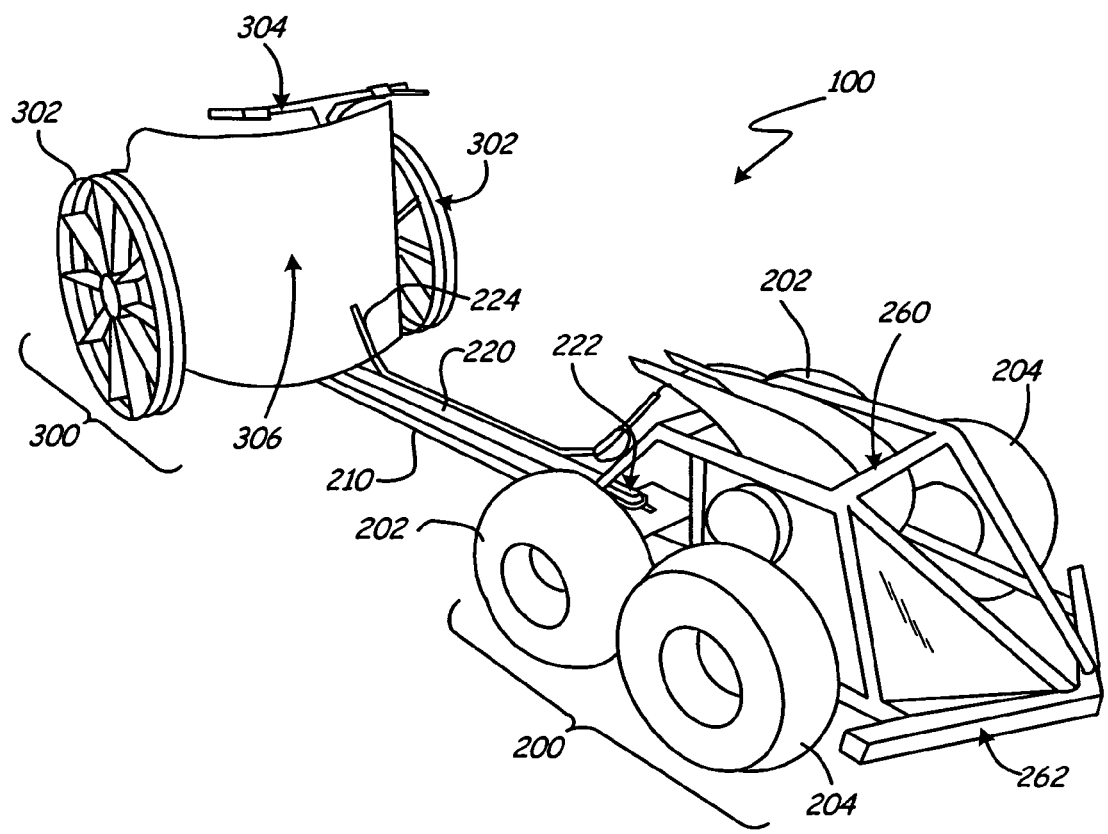
FIG. 1 is a perspective view of the present invention.

The present invention includes a motorized chariot generally indicated at 100 in FIG. 1. The motorized chariot 100 includes a drive unit 200 and carrier unit 300. The drive unit 200 pulls the carrier unit 300 by way of a rigid tongue 220. The tongue 220 is rigidly attached to the carrier unit 300 and is pivotally attached through a ball and coupler hitch arrangement 222 to the drive unit 200. Alternatively, the ball and coupler hitch could be disposed between the tongue and the carrier unit 300 while the other end is rigidly attached to the drive unit 200. The drive unit 200 provides motive force for pulling the carrier unit 300 by virtue of its connection through the tongue 220.

Figure 2:
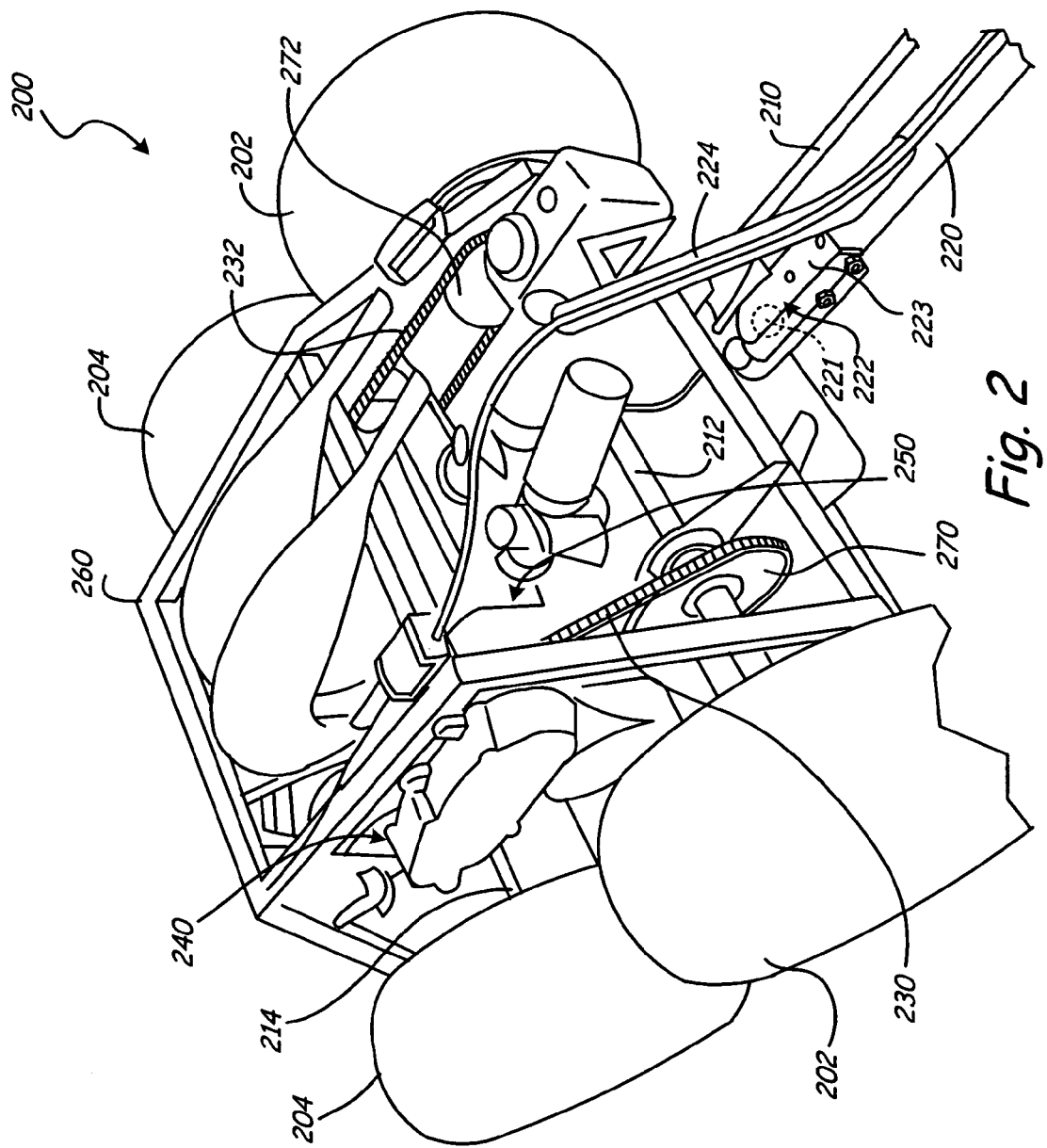
FIG. 2 is a perspective view of the drive unit of the present invention.

The drive unit 200 includes a front pair of ground engaging wheels 204 and a rearward pair of grounding engaging wheels 202 as illustrated in FIG. 2. Both sets of wheels 204 and 202 are preferably driven.

The power to drive the wheels 204 and 202 is provided by an engine 250. The engine 250 can be, for example, an 80 horsepower two-stroke snowmobile engine. However, the engine can also be a four-stroke internal combustion engine or it may be powered by other sources such as an electric motor.

The output of engine 250 is transmitted to a clutch 240. The clutch 240 is a simple centrifugal clutch or may be a more complex variable ratio clutch commonly associated with snowmobile engines. It is preferable although not necessary that clutch 240 disengages at low engine speeds allowing the engine 250 to idle without providing motive force to the motorized chariot 100 so that the motorized chariot 100 may remain stationary.

A drive chain 230 is coupled to a sprocket 270 and transfers rotational power to a rear axle 12. Wheels 202 are rotated by the axle 212. A second sprocket 272 further transfers rotation via a secondary drive chain 232 to a sprocket (not shown) similar to sprocket 272 that is fixedly attached to the front axle 214 thereby turning the front axle and the wheels 204 which are attached to the front axle 214. Alternatively, a drive chain 230 may be coupled to the front axle 214 and to the secondary drive chain 232 to drive the rear axle 212.

Drive unit 200 comprises a frame 260 on which the drive components of the motorized chariot 100 are secured. In one embodiment, the frame 260 has a wedge-shaped portion front portion 262 as shown in FIG. 1 which provides structural support and protection of the drive unit 200 against front impacts.

The drive unit 200 as illustrated is shown utilizing a configuration with four wheels. The use of two axles provides stability against tipping and/or rollovers. It further provides a stable connection to the attached carrier unit 300. It is important to note that other wheel configurations may be used on the drive unit 200 without departing from the spirit and scope of the present invention.

Figure 5:
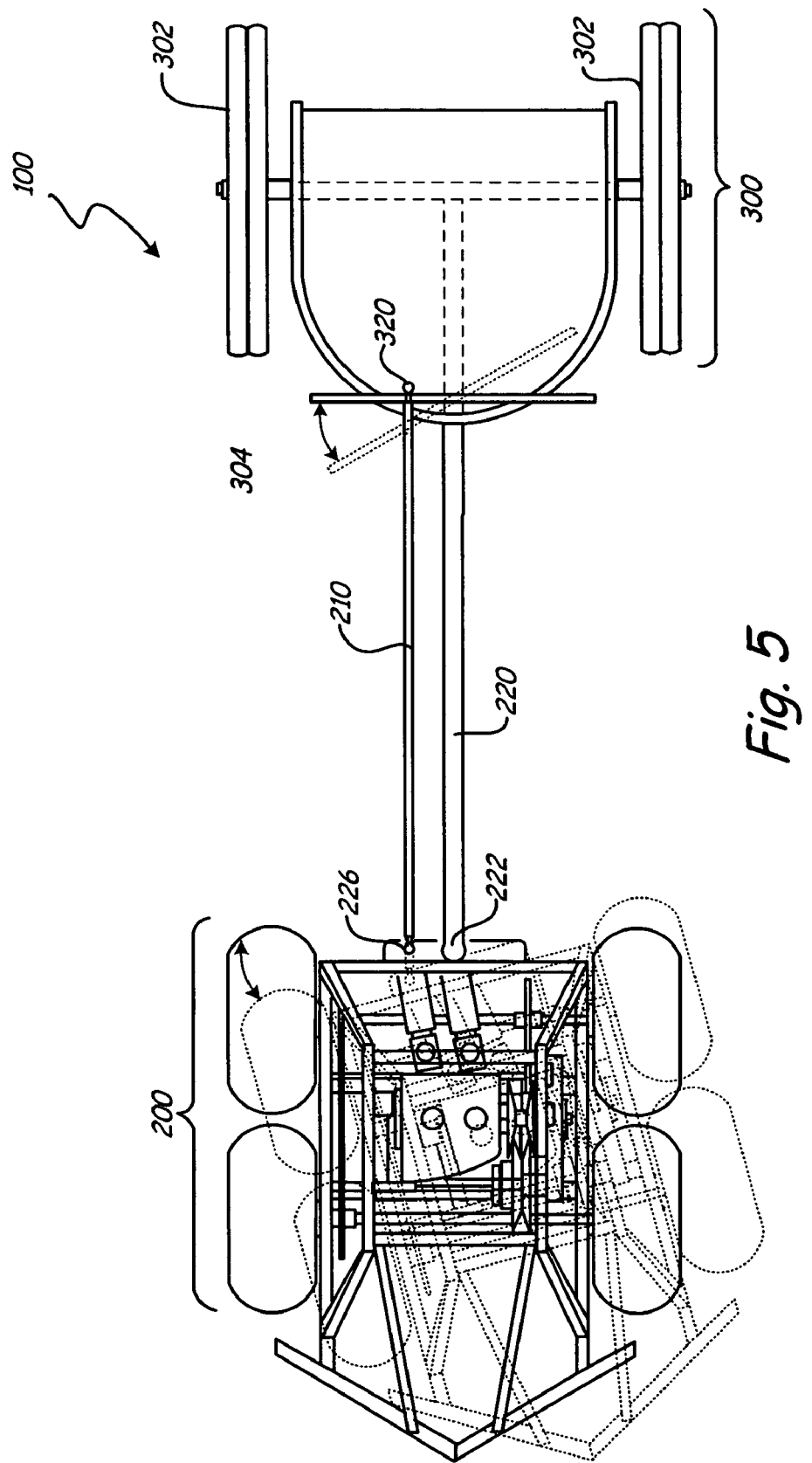
FIG. 5 is a top view thereof.

The trailer tongue 220 attaches the carrier unit 300 to the drive unit 200. Hitch 222 connects the trailer tongue 220 to the drive unit 200. The hitch 222 includes a ball 221 and a hitch coupler 223 that is a typical ball-joint type trailer hitch commonly used to attach trailers to automobiles. The hitch 222 provides a pivotal connection between the carrier unit 300 and the drive unit 200 which enables angular movement between the carrier unit 300 and the drive unit 200 as best illustrated in FIG. 5 to turn the chariot 100. The ball joint's pivotal connection provides a pitch, yaw and roll connection that compensates for movement including turning on uneven terrain.

Figure 3:
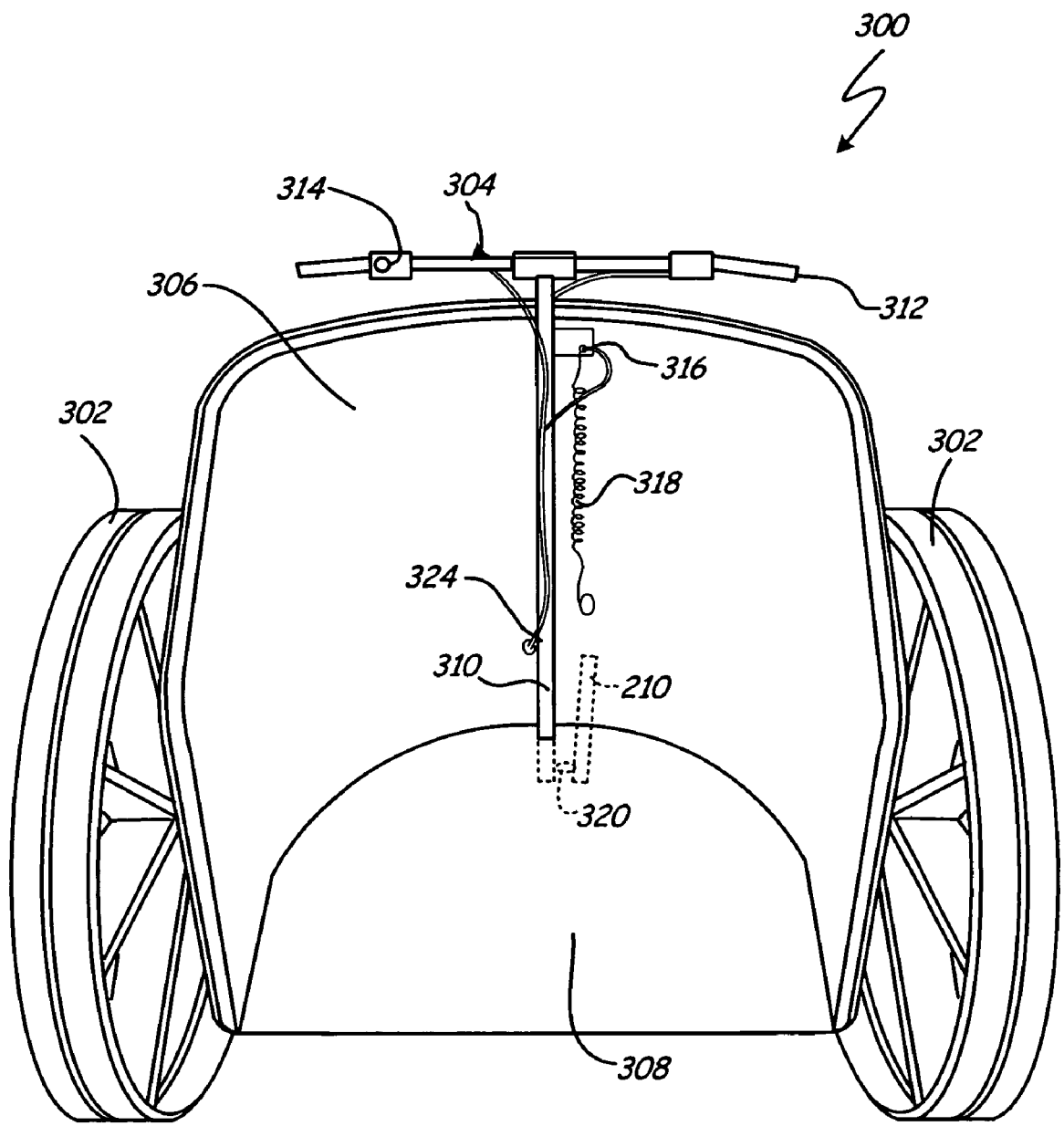
FIG. 3 is a perspective view of the driver carrier unit of the present invention.

The carrier unit 300, as illustrated in FIG. 3, provides a place for a driver to ride on and to control the motorized chariot 100. By driver is meant a person who drives the chariot. The unit 300 may also carry one or more passengers. The unit 300 includes a shield wall 306 which protects the driver from rocks or other debris during operation of the motorized chariot 100. The carrier unit 300 further includes a floor 308 upon which the driver stands or sits during operation. The back is open to permit the driver easy access to the unit 300 and for easy access off the unit. Easy access from the unit may be critical if the unit were to tip over such as in a chariot race.

The carrier unit 300 is supported by wheels 302 which are typically constructed of metal. However the wheels may be constructed of wood, rubber, plastic or other suitable materials. In one embodiment, as illustrated, the surfaces of the wheels 302 are smooth (without treads) enabling the carrier unit 300 to slide laterally when the motorized chariot 100 is traveling through a turn at a high speed. Such lateral movement of the carrier unit 300 is especially useful when the motorized chariot 100 is utilized in a racing environment.

A driver (not shown) positioned on the carrier unit 300 controls the motorized vehicle 100 through handlebars 304. The handlebars 304 are connected to a steering rod 310. Turning the handlebars 304 rotates the rod 310 about its axis. Instead of handlebars 304, a wheel could be used to turn the steering rod 310. The rod 310 is connected to a tie-rod 210 at tie-rod joint 320. Turning the handlebar 304 causes the steering rod 310 to rotate which moves the tie-rod 210 back and forth (along the tie-rod's axis) to either pull or push against the drive unit 200 causing pivoting at the hitch 222. Pivoting at the hitch 222 enables the motorized chariot 100 to turn as illustrated in broken lines in FIG. 5.

Other types of steering systems are also contemplated. For example, conventional steering such as rack-pinion or ball-screw steering mechanisms that are power assisted either hydraulically or electronically can be used to steer the motor chariot.

A throttle handle 312 and brake lever 314 are disposed on the handlebars 304. Cables 324 run from the throttle handle 312 to control the power and speed of the engine 250 as is well known. By turning the throttle handle, the cable 324 controls the throttle. Similarly, the brake lever 314 operates a brake or brakes on the wheels. Typically, disk brakes are used similar to the mechanisms used in motorcycles to operate motorcycle disk brakes.

A kill switch 316 is provided for safety purposes. A tether 318 is attached to the kill switch 316 and is further attached to the driver's clothing or arm. If the driver falls off or wishes to stop the chariot's engine quickly, the tether 318 is disengaged which operates the kill switch 316. The kill switch 316 and the tether 318 are similar to the types of safety mechanisms used in personal watercraft and snowmobiles.

Figure 4:
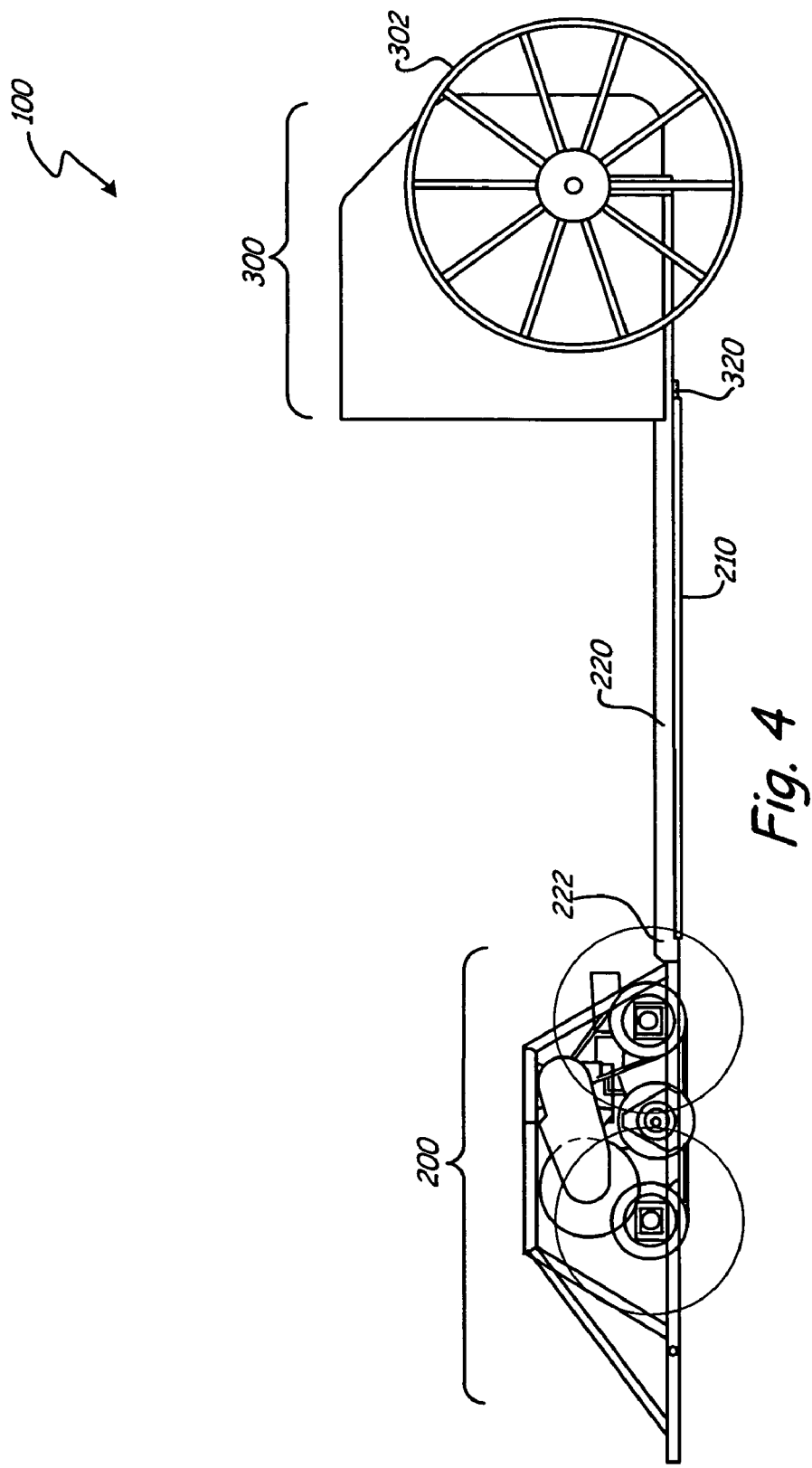
FIG. 4 is a side view of the motorized chariot of the present invention.

FIGS. 4 and 5 are schematic side and top views and further illustrate that the handlebars 304 are coupled to the tie-rod 210 at the tie-rod joint 320. The tie-rod 210 is securely attached to the drive unit 200 at the connection 226. Rotation of the handlebars 304 causes the tie-rod 210 to pull or push depending on a direction of rotation of the steering rod, against the connection 226 resulting in pivoting at the hitch 222.

Although the present invention has been described with reference to preferred embodiments, workers skilled in the art will recognize that changes may be made in form and detail without departing from the spirit and scope of the invention.

What is claimed is:

1. A motorized chariot comprising:
 a drive unit having a frame, a plurality of first ground engaging wheels rotatably attached to the frame, and a motor disposed on the frame, the motor providing motive force to the first ground engaging wheels;
 a driver carrier unit having a platform for carrying a driver and a plurality of second ground engaging wheels rotatably attached to the platform;
 a tongue extending between the platform and the drive unit;
 a pivotal connection pivotally attaching the drive unit with the carrier unit;
 a steering mechanism including a tie-rod attached to the frame of the drive unit at one end and to the carrier unit at the other end, the tie-rod being moveable between the carrier unit and the frame such that movement of the tie-rod causes pivoting of the driver unit with respect to the carrier unit for tuning the chariot; and further including a steering rod capable of being turned by the driver on the platform and being connected at a distal end to the tie-rod for providing movement to the tie-rod.

2. The motorized chariot of claim 1 wherein the pivotal connection is a pitch, yaw and roll connection.

3. The motorized chariot of claim 1 wherein the steering mechanism includes a handlebar attached to the steering rod such that movement of the handlebar rotates the steering rod.

4. The motorized chariot of claim 3 and further comprising a throttle mechanism for controlling the output of the motor, the throttle mechanism having a throttle lever positioned within the driver carrier unit and a throttle cable extending therefrom to the motor.

5. The motorized chariot of claim 1 wherein the drive unit has four first ground engaging wheels.

6. The motorized chariot of claim 1 wherein the driver carrier unit has two second ground engaging wheels.

7. The motorized chariot of claim 1 wherein the pivotal connection comprises a ball and hitch coupler.

8. A motorized chariot comprising:
 a drive unit having a frame, a plurality of first ground engaging wheels rotatably attached to the frame, and a motor disposed on the frame, the motor providing motive force to the first ground engaging wheels;
 a driver carrier unit having a platform for carrying a driver and a plurality of second ground engaging wheels rotatably attached to the platform;
 a tongue extending between the platform and the drive unit;
 a pivotal connection pivotally attaching the drive unit with the carrier unit comprising a ball and hitch coupler;
 a steering mechanism including a tie-rod attached to the frame of the drive unit at one end and to the carrier unit at the other end, the tie-rod being moveable between the carrier unit and the frame such that movement of the tie-rod causes pivoting of the driver unit with respect to the carrier unit for turning the chariot; and further including a steering rod capable of being turned by the driver on the platform and being connected at a distal end to the tie-rod for providing movement to the tie-rod.

9. The motorized chariot of claim 8 wherein the pivotal connection is a pitch, yaw and roll connection.

10. The motorized chariot of claim 8 and further comprising a throttle mechanism for controlling the output of the motor, the throttle mechanism having a throttle lever positioned within the driver carrier unit and a throttle cable extending therefrom to the motor.

11. The motorized chariot of claim 8 wherein the drive unit has four first ground engaging wheels.

12. The motorized chariot of claim 8 wherein the driver carrier unit has two second ground engaging wheels.

\* \* \* \* \*